Nov. 27, 1951 F. H. BRAY ET AL 2,576,099

ELECTRICAL TRANSLATOR OF BINARY CODE TO DECIMAL CODE

Filed Oct. 29, 1947 5 Sheets-Sheet 1

Inventors
Frederick Harry Bray
George Clifford Hartley
Desmond Sydney Ridler
by Robert Harding Jr.
Attorney Inventors.
Frederick Harry Bray
George Clifford Hartley
Desmond Sydney Ridler
by Robert Harding Jr.
Attorney

ELECTRICAL TRANSLATOR OF BINARY CODE TO DECIMAL CODE

Filed Oct. 29, 1947

Inventors
Frederick Harry Bray
George Clifford Hartley
Desmond Sydney Ridler
by Robert Harding Jr.
Attorney Inventors
Frederick Harry Bray
George Clifford Hartley
Desmond Sydney Ridler
by Robert Harding Jr.
Attorney Nov. 27, 1951 F. H. BRAY ET AL 2,576,099

ELECTRICAL TRANSLATOR OF BINARY CODE TO DECIMAL CODE

Filed Oct. 29, 1947 5 Sheets-Sheet 5

Inventors
Frederick Harry Bray
George Clifford Hartley
Desmond Sydney Ridler
by Robert Harding Jr
Attorney Patented Nov. 27, 1951 2,576,099

UNITED STATES PATENT OFFICE 2,576,099

ELECTRICAL TRANSLATOR OF BINARY CODE TO DECIMAL CODE

Frederick Harry Bray, George Clifford Hartley, and Desmond Sydney Ridler, London, England, assignors to International Standard Electric Corporation, New York, N. Y.

Application October 29, 1947, Serial No. 782,734
In Great Britain October 30, 1946

5 Claims. (Cl. 177—380)

This invention relates to counting devices comprising discharge tubes and has for its object a reduction in the number of tubes required for the purpose.

The main feature of the invention comprises a counting device comprising discharge tubes adapted to count on a binary basis.

The binary code is particularly adaptable for use in electronic counting circuits, the conducting or non-conducting condition of vacuum tubes rendering an ideal indication of a scale of two. However, it is more convenient in many instances to operate various equipment according to the decimal system, which, of course, requires a scale of ten. Therefore, this invention comprises among other things, a convenient circuit for translating stored binary digits into decimal digits for utilization in equipment designed to be responsive to such digits.

To make the invention clearly understood, reference will now be made to certain embodiments shown in the accompanying drawings, in which:

Fig. 4 illustrates another embodiment of an electric counter; while

These figures are also used to illustrate the invention of applicant's copending application No. 782,733, filed simultaneously herewith.

Figure 1A:
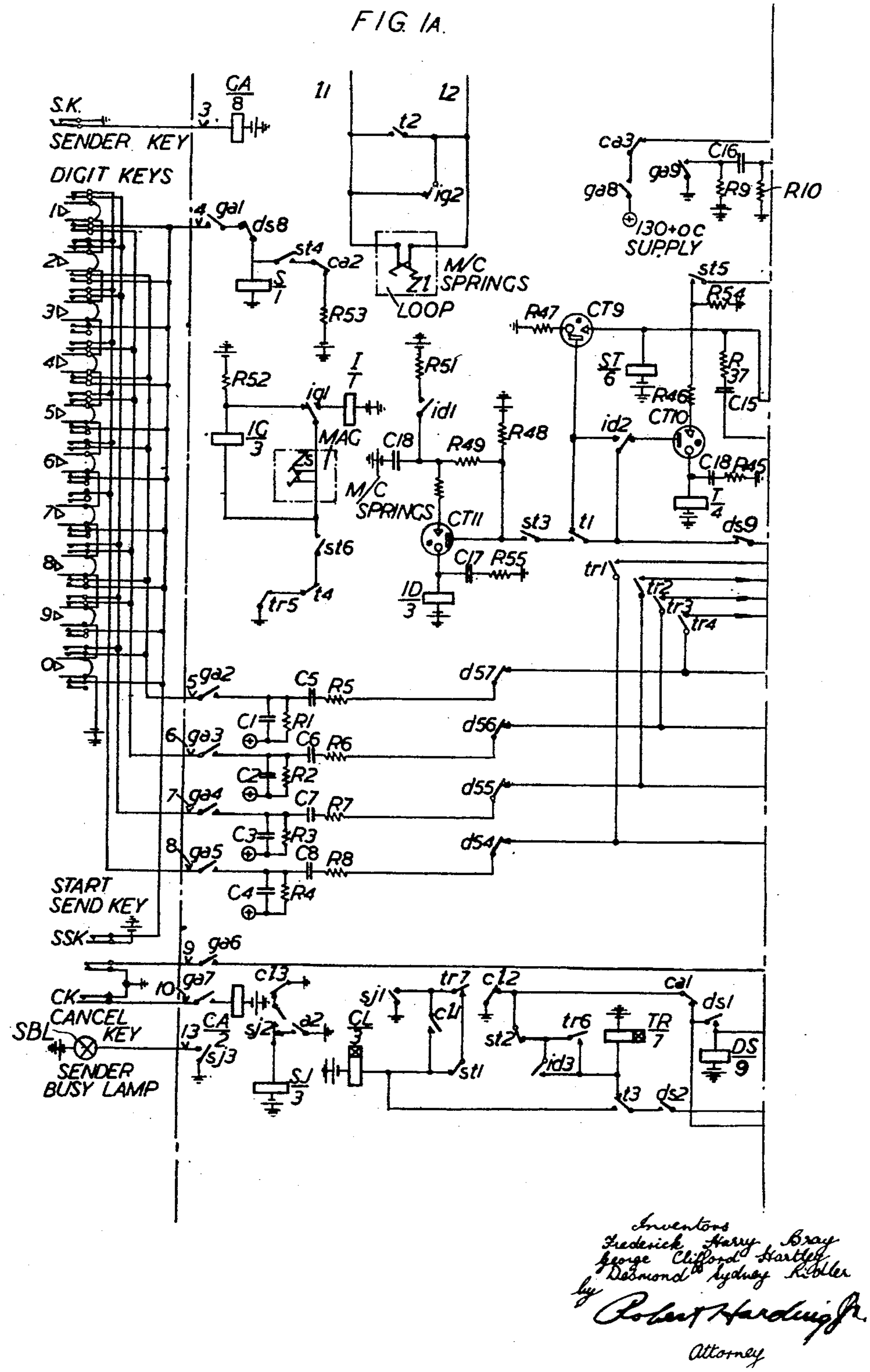
Figs. 1A and 1B illustrate an electric counter combined with an electric storage device for use for instance in an automatic telephone system.
Figure 1B:
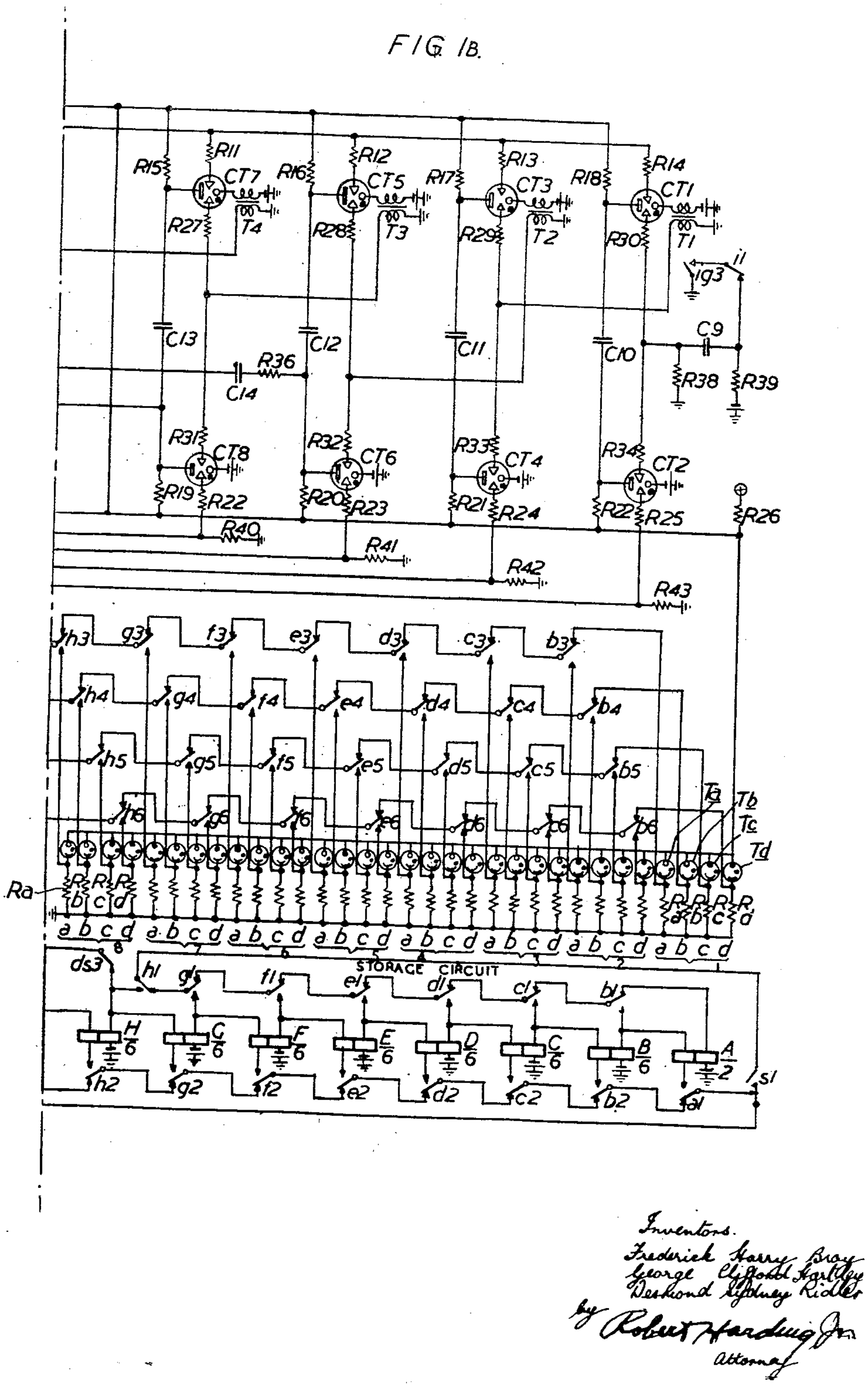

The arrangement illustrated in Figs. 1A and 1B may be used in an automatic telephone system where it is required to select a number by successively operating digit keys, each key corresponding to a digit of the number, to store the number in an electric storing device, and subsequently to send impulses into a line, which correspond to the number selected, or to respond to revertive impulsing from a distant point. Figs. 1A and 1B should be placed side-by-side and considered as one figure; Fig. 1B being placed to the right of Fig. 1A.

The circuit arrangement of Figs. 1A and 1B illustrates a key-sending position at its left hand side, a storage circuit at the lower part of its right hand side, and an electric counter at the upper part of its right hand side.

The key-sending position comprises a sender key SK, ten digit keys corresponding to the numerals 1, 2 . . . 9, 0, a start-send key SSK, a cancel key CK, and a sender-busy lamp SBL.

*Storage circuit*

Figures 2, 3:
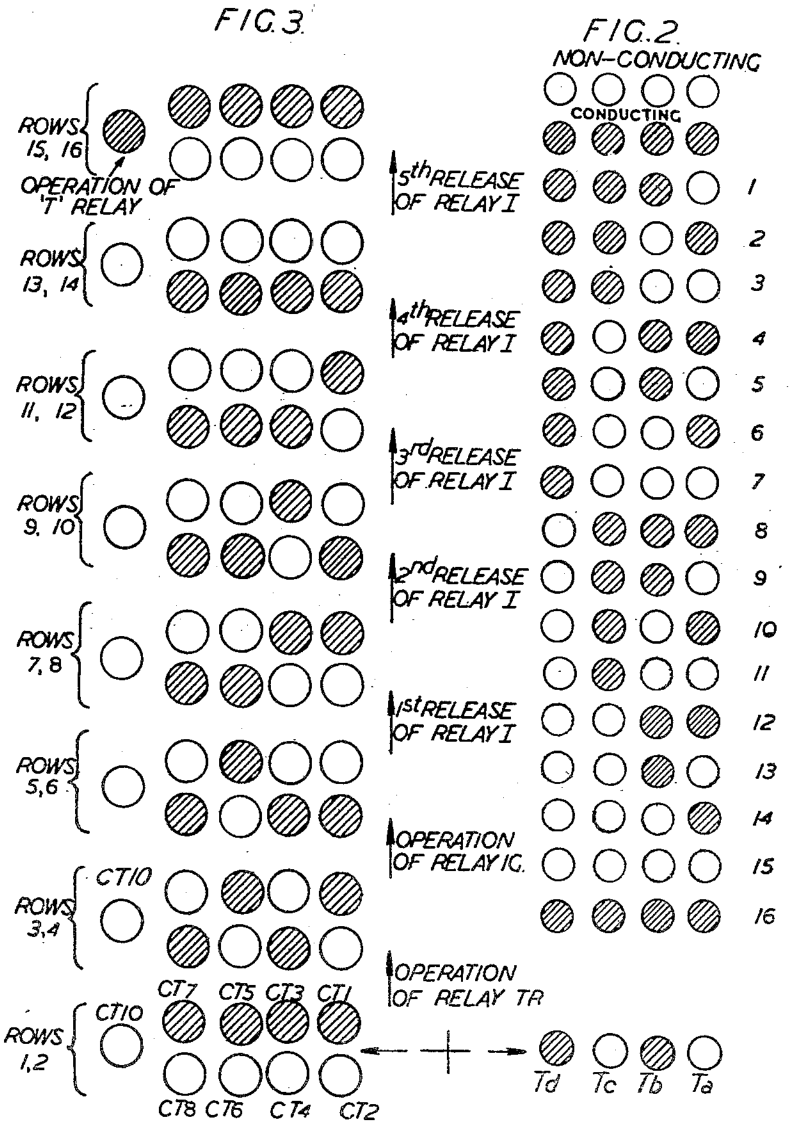
Fig. 2 illustrates a code for storing numbers 1 . . . 15 on a set of four storage devices, such as neon tubes.
Fig. 3 illustrates the method of counting out the record on the counter.

The storage circuit comprises eight sets 1, 2 . . . 7, 8, each of four circuits *a*, *b*, *c*, *d*, of neon or the like gas discharge tubes T*a*, T*b*, T*c*, T*d*, each connected in series with a high ohmic resistor R*a*, R*b*, R*c*, R*d* respectively. A neon or the like tube needs a potential for striking the tube which is considerably higher than the lowest potential necessary for sustaining the discharge through the tube after the tube has been ignited (hereinafter and in the claims shortly called sustaining potential). An operating potential between the striking and sustaining potentials will maintain the tube in either of two different stable conditions. If the potential across the tube has been momentarily raised above the striking potential, the tube will ignite and the discharge through the tube will be maintained and the tube be conducting when the potential has returned to the normal operating potential. If the potential is now momentarily lowered below the sustaining potential, the discharge through the tube will be quenched, and the tube will become non-conducting and remain non-conducting when the potential has again returned to the normal operating potential. Thus, each tube may be in one of two different conditions which may be ascertained by sensing the potential across the respective series resistor. As indicated in Fig. 2, a set of four tubes may assume sixteen different patterns depending on which of the four tubes are conducting, and which are non-conducting. By selecting ten different patterns out of the possible sixteen patterns, each digit may be stored and represented on a binary basis on such a set of four tubes. In Fig. 2, each row contains four circles corresponding to the circuits T*a*, T*b*, T*c*, T*d* of a set of four neon tubes each in series with a resistor, the black circles indicating a circuit comprising a conducting tube and the white circles indicating a circuit comprising a non-conducting tube. Fig. 2 illustrates the 16 possible patterns of which ten correspond to the digits 1, 2 . . . 9, 0, these being the only ones used in the example given. Tubes T*a*, T*b*, T*c*, T*d* represent ascending orders of numbers on a binary scale; 1, 2, 4, 8, and record digits in such a way that operating tubes indicate zero and quiescent tubes indicate a binary digit. Thus line 5 from left to right represents the number 0101 on the binary scale or 0+4+0+1 on the decimal scale, while line 9 represents 1001 on the binary scale, or 8+0+0+1 on the decimal scale. It will also be recognized that with the arrangement of Fig. 1B which comprises eight sets each of four neon tubes, a number consisting of up to eight digits may be stored.

For striking the four gas discharge storage tubes T*a* . . . T*d* of a set, triggering capacitors C5, C6, C7, C8 are provided as shown in Fig. 1A, which are normally charged from a supply source through the resistors R1, R2, R3, R4, to the positive operating potential of the gas discharge tubes. The resistors R1, R2, R3, R4 are shunted respectively by additional capacitors C1, C2, C3, C4. The triggering capacitors are connected in series with resistors R5, R6, R7, R8 for limiting surge currents. In the position illustrated in Fig. 1A, the triggering capacitors C5, C6, C7, C8 in series with the respective series resistors R5, R6, R7, R8, are connected across various contacts, which will be described further below, to the anodes of the gas discharge tubes T*a*, T*b*, T*c*, T*d*, of the first set of tubes of the storage circuit.

*Counter circuit*

The electric counter comprises eight cold cathode discharge tubes CT1, CT2 . . . CT7, CT8, shown in Fig. 1B. Each of these tubes comprises a cold cathode, an anode, and two auxiliary electrodes for striking the tube. The tubes are arranged to form two sets of four tubes, the first set comprising the tubes CT1, CT3, CT5, CT7 and the other set the tubes CT2, CT4, CT6, CT8. The tubes also form four pairs of tubes, the first pair comprising the tubes CT1 and CT2, the second pair the tubes CT3 and CT4, the third the tubes CT5 and CT6, and the fourth the tubes CT7 and CT8.

Before a number is selected, the sender SK key is closed whereby the relay GA is energised. The contact $ga9$ of the relay GA is closed for a purpose which will be described further below. The contact $ga8$ of the relay GA is closed and applies the positive operating potential derived from the supply source to all the anodes of the gas discharge tubes T*a*, T*b*, T*c* and T*d* of the storage circuit, the cathodes of the tubes being connected to the respective series resistors R*a*, R*b*, R*c* and R*d*, the free terminals of which are connected to the earthed negative operating potential of the supply source. The contact $ga8$ also applies the positive operating potential to the main anodes of all the cold cathode tubes CT1—CT8 of the electric counter, the cathodes of the counter tubes of the first set being connected across the primary windings of cathode transformers T1, T2, T3, T4, and the cathodes of the counter tubes of the second set being directly connected to the negative terminal of an additional supply source. The contact $ga8$ is closed and connects a relay CA to the cancel key CK. The contact $ga6$ connects a relay H to the start send key SSK. The contacts $ga5$—$ga2$ connect respectively the triggering capacitors C8, C7, C6, C5 to the digit keys. The contact $ga1$ connects a relay S to the digit keys.

*Operation*

When now a digit key is operated, a certain combination of gas discharge tubes of the first set of tubes of the storage circuit is ignited in the following manner: Assume the first digit key to be operated is key 5 corresponding to the numeral 5. In this case, as will be seen from Fig. 2, the gas discharge storage tubes T*d* and T*b* of the first set should be ignited, while the storage tubes T*c* and T*a* should not be ignited. By operating the digit key 5, the negative terminal of the additional supply source, whose positive terminal is earthed, is connected to the capacitors C8 and C6. Thereby the charges of these capacitors are reversed. The charging currents flow through the resistors R*a* and R*c* of the first set of tubes of the storage circuit. Thereby, the potentials across the corresponding tubes T*b* and T*d* are momentarily raised above the striking potential of the tubes T*b* and T*d* which are ignited and remain ignited after the digit key 5 has been released. The capacitors C1, C2, C3, C4 ensure that the ignited tubes are not quenched while the triggering capacitors C6, C8 are recharged on release of the digit key. The operation of a digit key also energizes the relay S. Its contact $s1$ (see right hand bottom corner of Fig. 1B) is operated whereby the relay A is energised via back contacts $b1$—$h1$, $s1$ front, $ca1$, $cl2$ back. A relay SJ is energised over the closed contact $a2$ and is locked over its contact $sj2$ to $cl3$ back. Contact $sj3$ closes the circuit for the sender busy lamp SBL, which commences glowing. Contact $sj1$ is closed without effect. When the digit key 5 is released, the relay S is de-energised and its contact $s1$ is released. Thereby, the relay A is locked, right hand winding of B, left hand winding of A, $a1$ front, $s1$, $ca1$, $cl2$ back. Relay B is energised. The contacts $b3$—$b6$ disconnect the triggering capacitors C5, C6, C7, C8 from the first set of gas discharge tubes of the storage circuit and connect them to its second set of gas discharge tubes.

The next operation of a digit key triggers a pattern which represents the numeral corresponding to the respective key on to the second set of gas discharge tubes of the storage circuit in an analogous manner to that just described with reference to the first set of tubes. The relay S is again energised and operation of its contact $s1$ causes the locked relay A to be released but relay B holds via $b1$—$h1$. The release of the digit key causes the relay S to de-energise whereupon the relay C is energised over contacts $b2$ front, $a1$, $s1$ back in series with the locking winding of relay B. Contacts C3, C4, C5, C6 cause the triggering capacitors C5, C6, C7, C8 to be disconnected from the second set of tubes and to be connected to the third set of tubes.

It will be realised that in the manner described patterns corresponding to the digits of a number may successively be impressed on the sets of neon or the like tubes of the storage circuit by successively operating the respective digit keys.

If the number to be stored comprises eight digits, the relay DS is, in a manner similar to the relays B to H, energised on release of the eighth digit key operated and is locked over its contact $ds1$, while the relay H is released by short-circuit of its left hand winding. If, however, the number to be stored comprises less than eight digits, the start-send key SSK has to be operated after the last digit key has been released. Operation of the start-send key energises the relay H over the contacts $ga6$ and $ds3$, whereby the relay DS is, again, energised and, as before, closes a circuit via a winding of DS, left hand winding of H, contacts $h2$—$s1$, $ca1$, $cl2$. The main winding of relay H is de-energised by the operation of the contact $ds3$, while its locking winding is short circuited by contact $ds1$ which is closed so that relay H releases its contacts. In both cases, the contacts $ds4$—$ds7$ disconnect the storage circuit from the triggering capacitors C5, C6, C7, C8. The contact *ds8* disconnects the relay S from the digit keys. Operation of DS also closes contact *ds3* associated with two additional cold cathode discharge tubes CT9 and CT10 (Fig. 1A), each comprising a cold cathode, a main anode, and an auxiliary anode. The contact *ds2* is closed whereby the relay TR is energised via *t3* back, *ds2* front, *h2*—*s1* back, *ca1*, *cl2* back and locks over *tr6*, *st2*, *cl2*.

The contacts *tr1*—*4* are closed and connect the storage circuit to the electric counter to control the transmission of the stored digits into the line *l1* and *l2*. It will further be appreciated that since the number has been stored in a binary code on the storage circuit, it has to be translated from the binary code into the decimal system when sending corresponding impulses into the line.

A capacitor C16 is normally charged across resistors R9 and R10. The capacitor C16 is connected over surge limiting resistors R11, R12, R13, R14 to the upper auxiliary electrode of each of the cold cathode tubes CT7, CT5, CT3, CT1 forming the first set of cold cathode tubes of the electric counter. The tubes are of the type provided with two auxiliary electrodes either of which may be used for triggering the tube. As explained hereinbefore, the relay GA was energised and its contact *ga9* closed when the sender key was closed. Closing of the contact *ga9* causes the capacitor C16 to be discharged through the resistor R10. Thereby, the potential on the upper auxiliary electrodes of the cold cathode tubes CT7, CT5, CT3, CT1 is momentarily raised, so that these tubes are ignited, the discharge through these tubes being maintained across the main discharge space between the cathodes and anodes, which receive the positive operating potential from the supply source over the closed contact *ga8*, contact *ca3* back and anode resistors R15, R16, R17, R18 respectively. The commencement of the discharge currents across the main discharge spaces of the tubes CT1, CT3, and CT5, which flow through the primary windings of the cathode transformers T1, T2, T3, causes an electromotive force to be momentarily induced in the secondary transformer windings of sufficient amplitude to trigger the cold cathode tubes CT4, CT6, and CT8. These tubes, however, do not sustain since their main anode potential is, at the same time, reduced by currents charging anode capacitors C11, C12, C13. The conditions of the eight tubes of the electric counter is indicated in the rows 1, 2 of Fig. 3, row 2 indicating that the cold cathode tubes CT1, CT3, CT5, CT7 of the first set of tubes are conducting and row 1 indicating that the tubes CT2, CT4, CT6, CT8 are non-conducting. Fig. 3 also indicates that the cold cathode tube CT10 is non-conducting.

The anode capacitors C11, C12, C13 and C10, which are also charged, are connected between the anodes of the four pairs of tubes, one capacitor for each pair. When any of the cold cathode tubes CT2, CT4, CT6, CT8 of the second set of tubes of the electric counter is triggered in a manner to be explained hereafter, the charging current flowing through the respective anode capacitor causes the potential on the anode of the corresponding tube of the first set to be sufficiently lowered, so that such corresponding tube is quenched. In other words, the provision of the anode capacitors ensures that on triggering and striking of one tube (no matter whether it belongs to the first or second set of four tubes) of the electric counter, the other tube belonging to the same pair of tubes is automatically quenched.

Closing of the contacts *tr1*—*tr4* connects the cathodes of the neon or the like discharge tubes *Ta*, *Tb*, *Tc*, *Td* of the first set of tubes of the storage circuit respectively to limiting resistors R22, R23, R24, R25 connected to the lower auxiliary electrodes of the cold cathode tubes CT8, CT6, CT4, CT2 of the electric counter. Any ionised storage tube causes a potential drop across its series resistor which is applied to the said auxiliary electrode of the corresponding cold cathode tube of the second set of the electric counter and causes such tube to strike. Thereby the other tube of the same pair of tubes is quenched.

In the example discussed hereinbefore in which the first digit key operated was the digit key 5, the binary code corresponding to the numeral 5 was impressed on the first set of gas discharge tubes of the storage circuit. Consequently the tubes *Tb* and *Td* of the first set of tubes of the storage circuit are ignited and the tubes *Ta* and *Tc* are not ignited. This causes a voltage drop across the resistors *Rb* and *Rd* of the first set which, in turn, causes the cold cathode tubes CT8 and CT4 of the second set of tubes of the electric counter to strike when the contacts *tr1*—*tr4* are closed. The tubes CT8 and CT4 belong to the fourth and second pairs of tubes respectively of the electric counter. These tubes remain ionised and striking of these tubes causes the other tubes of the fourth and second pairs, namely tubes CT7 and CT3, to be quenched as described above. The condition of the eight tubes of the electric counter after the operation of the relay TR is represented in the third and fourth rows of Fig. 3. The pattern corresponding to the digit 5, which is repeated in the last row of Fig. 2 is thus transferred to the second set of tubes of the electric counter (as shown in the third row from the bottom of Fig. 3); the first set of tubes of the electric counter represents a pattern (see fourth row from the bottom of Fig. 3) that is complementary to that impressed on the said second set of tubes, the tube CT10 being still non-conducting. The cold cathode tubes contrary to the arrangement of the storage tubes *Ta* . . . *Td* work on the basis that an operated tube represents a binary digit while an unoperated tube represents a zero. The tubes CT1—7 therefore record the number stored while the tubes CT2—8 record the complement to fifteen.

From an inspection of Fig. 2 it will be seen that the digit code has been chosen in such a manner that any digit requires either tube *Tc* or tube *Td* or both these tubes of a set of the storage circuit to be ignited. Consequently, when the pattern has been transferred to the electric counter either tube CT8 or tube CT6 or both these tubes of the second set of tubes will be ionised. Ionisation of either or both these tubes causes a negative pulse, owing to the sudden change of potential, on the corresponding anode or anodes of the tube or tubes CT8 and/or CT6 which triggers across the capacitor C15 and resistor R37 and/or capacitor C14 and resistor R36, the cold cathode tube CT9 which becomes ionised across the discharge space between its cold cathode and anode. Thereby the relay ST is energised. Its contact *st1* is opened; contact *st2* is opened and de-energises relay TR whereby the cold cathode tubes of the second set of the electric counter are disconnected from the gas discharge tubes of the first set of the storage circuit; contact st3 is closed and prepares the anode circuit of a cold cathode tube CT11; contact st4 energises the relay S; contact st5 is closed and connects the auxiliary electrode of the cold cathode tube CT10 to the secondary winding of the cathode transformer T4 of the tube CT7; contact st6 is closed.

*Impulse sender*

An impulse sender Z is connected to the line l1, l2 and comprises contact springs Zl connected across the line l1, l2, which are periodically opened and closed so that impulses may be sent into the line l1, l2 while the contact springs Zl are open. Additional contact springs Zs are provided which operate in synchronism with the springs Zl. While the springs Zs are closed a relay IG is short-circuited. Now, owing to the contacts tr5 and st6 being closed, the relay IG is energised on the next opening of the contact springs Zs. Its contact ig1 disconnects the springs Zs from the relay IG which, thus, will no longer be short-circuited when the springs Zs close again, and connects the said springs to the relay I which will be energised on closing of the springs Zs. Contact ig3 is closed (see right hand end of counter) and discharges a triggering capacitor C9 across a resistor R38, the capacitor C9 being normally charged from the additional supply source across the resistors R38 and R39. The capacitor C9 is connected across limiting resistors R30 and R34 to the interconnected auxiliary electrodes of the cold cathode tubes CT1, CT2 which form the first pair of tubes of the electric counter. By the discharge of the capacitor C9 on closing of the contact ig3 the non-ignited tube of the first pair is ignited. This in turn causes the previously ignited tube to be quenched as hereinbefore described. In the example referred to above, the tube CT2 was not ignited and the tube CT1 ignited. After operation of the relay IG and closing of the contact ig3 the tube CT2 is ignited and the tube CT1 is not ignited. The condition of the eight tubes of the electric counter after the operation of the relay IG is represented in the 5th and 6th rows of Fig. 3, the tube CT10 being still non-conducting. The condition of the upper set of tubes now corresponds to digit 4, Fig. 2. It will be seen that an impulse has been interpolated prior to synchronous impulsing both to line l1, l2 and to the counting tubes. This is because it is desired not only to count out the digit to the condition shown in rows 13, 14, Fig. 3, but to return these tubes to the original condition shown both in rows 1, 2 and rows 15, 16, Fig. 3.

When the springs Zs close again, the relay I is energised and causes the contact i1 to open. Thereby, the triggering capacitor C9 is recharged.

Contacts ig2 remove the short-circuit from springs Zl but not in time for an impulse to be sent to line during the opening of springs Zs, Zl which causes operation of IG. When the springs Zs open again, the springs Zl also open allowing the impulse sender to send a first impulse into the line l1, l2, which is no longer short-circuited by the contact ig2. On opening of the springs Zs, the relay I is de-energised, whereby the contact i1 is closed again and the capacitor C9 discharged, the contact ig3 being closed. The release of the relay I thus causes, in the example assumed, the tube CT1 to be ignited and the tube CT2 to be quenched. Striking of the tube CT1 causes an impulse through the secondary winding of the cathode transformer T1 which is connected across resistors R29 and R33 to the auxiliary electrodes of the second pair of tubes CT3 and CT4. Thereby the tube CT3 is now ignited and the tube CT4 is quenched. As the tube CT3 belongs to the first set of tubes, striking of tube CT3 causes a pulse through the secondary winding of its cathode transformer T2 which is connected across resistors R28 and R32 to the auxiliary electrodes of the third pair of tubes CT5 and CT6. Thereby, in the example assumed, the tube CT5 of the first set is quenched and the tube CT6 ignited. Since the ignited tube CT6 of the third pair is not associated with a cathode transformer, the tubes of the fourth pair are not triggered, the condition of the counter being indicated by the 7th and 8th row from the bottom of Fig. 3, the tube 10 being still not ignited. This further impulse to the counter has altered the setting of the second set of tubes from digit 4 to digit 3. When the springs Zs close again the relay I is energised, contact i1 is opened, the triggering capacitor C9 is charged, and on opening of the springs Zs the relay I is released for the second time. A second impulse is sent into the line l1, l2 owing to the simultaneous opening of the springs Zl. Again, the capacitor C9 is discharged, whereby the tube CT2 of the second set is ignited and the tube CT1 of the first set is quenched. Since the ignited tube belongs to the second set no further tube is affected, the condition of the electric counter being now represented by the 9th and 10th rows of Fig. 3, corresponding to digit 2. The springs Zl and Zs continue to operate in the manner described, whereby the relay I continues to be alternately energised and de-energised. On each release of the relay I an impulse is sent into the line l1, l2 and the first group of cold cathode tubes of the electric counter is triggered whereby the pattern on the electric counter is changed in the manner just described, the pattern after the third release of the relay I being shown in the 11th and 12th rows of Fig. 3, that after the fourth release in the 13th and 14th rows and that after the fifth release in the 15th and 16th rows of Fig. 3. It will be seen that after the fifth release all the cold cathode tubes of the first set are ignited and those of the second set quenched. Tube CT10 is also ignited as will be described below. The digit code shown in Fig. 2 has been so chosen that if any numeral, say for example numeral 5 or 8, has been stored, the condition of the tubes of the electric counter indicated in rows 15, 16, Fig. 3, will be reached after a corresponding number in the example 5 or 8, of releases of the relay I, and after a corresponding number of impulses, one on each release of this relay, has been sent into the line l1, l2. Furthermore, it will be recognised that whichever of the patterns of Fig. 2 is impressed on the record set of cold cathode tubes from the storage circuit, CT7 will be quenched either immediately if the pattern is that of digit 1–7 or after one or more pulses to the counting set, and is only re-ignited when the condition shown in the top row of Fig. 3 has been reached.

Re-igniting of the tube CT7 causes an impulse to be sent through the secondary winding of the cathode transformer T4, whereby the cold cathode tube CT10 is ignited, the contact st5 being closed. Thereby the relay T is energised. Its contact t1 quenches the tube CT9 and completes the anode circuit for tube CT11; contact t2 short-circuits the line l1, l2, and prevents further impulses from reaching the line; contact t3 changes over; contact $t4$ disconnects the relays I and IG from battery. Quenching of the tube CT9 causes the relay ST to be de-energised. Thereby, the relay S is de-energised whereby the contact $s1$ returns to normal. When ST operates S, the change-over of contacts $s$ operated relay A as previously described. Release of S now energises B in series with A and connects second set of storage tubes to contacts $tr1$—4 so that when eventually relay TR is re-energised, this second set of tubes will be connected to the electric counter. Contact $t1$ also causes a capacitor C18 to be charged through a resistor R49 via $st3$, $t1$, $ds9$, R26, positive battery, the time needed for charging the capacitor C18 providing a time interval between successive groups of impulses sent into the line and corresponding successive digits. When the capacitor C18 has been charged, the cold cathode tube CT11 ignites and discharges via the charging circuit of C18. Relay ID is energised. Contact $id1$ is closed and causes the capacitor C18 to discharge; contact $id2$ switches over, whereby the cold cathode tube CT10 is quenched and a positive potential applied to the main anode of the cold cathode tube CT9. Contact $id3$ is closed and energises the relay TR via $st2$, $cl2$ back. Thereby the contacts $tr1$—4 are closed and the electric counter is connected to the second set of tubes of the storage circuit and is ready to receive therefrom, the pattern previously impressed thereon and corresponding to the second digit of the stored number. The counter, again, operates as before.

If eight digits have been stored the release of the relay H, after the eighth digit has been counted and transmitted into the line, causes a clear down relay CL to be energised over the contacts $t3$, $ds2$, $h2$ to $b2$, $a1$, $s1$ $ca1$, $cl2$. Contact $cl1$ locks the relay CL across contact $sj1$ which is closed, relay SJ having been operated on the first operating of relay A and having remained locked thereafter via $sj2$, $cl3$ to light the sender busy lamp SBL. Contacts $cl2$ and $cl3$ are opened and release all the relays. The release of the relay SJ opens contact $sj1$, whereby the clear down relay CL itself is released, while contact $sj3$ opens and extinguishes the sender busy lamp.

If less than eight digits have been stored, the arrangement clears down when no code is transferred from a set of tubes of the storage circuit to the electric counter, since if no code is present neither of the cold cathode tubes CT8 and CT6 will be ignited. Therefore, the cold cathode tube CT9 is not triggered and relay ST is not energised. The clear down relay CL, which is slow to operate, will now be energised across contacts $sj1$, $tr7$, which are both closed, and contact $st1$ back. Operation of the relay CL clears down the arrangement in the manner just described.

If an incorrect digit has been keyed, the cancel key CK may be operated to restore the storage circuit to its initial condition. On operation of the cancel key relay CA is energised. Contact $ca3$ is opened, whereby the potential across all the neon or the like tubes of the storage circuit is lowered below the sustaining potential and all the tubes which may be ignited are quenched. Contact $ca1$ is opened and de-energises any of the relays A—H which may be energised. When the cancel key has been released, the relay CA is de-energised and the circuit is in its initial condition ready for operation.

It will be realised it would be possible to replace the combination of set of storage neons and the common counting tube assembly by a series of counting tube assemblies each directly marked from the keys or by other marking means.

Modifications of the arrangement illustrated in Figs. 1A and 1B are possible. For example, in the electric counter the cathode transformers T1, T2, T3, T4 may be replaced by capacitors combined with a rectifier, for example, a dry rectifier, or by neon tubes on the lines to be described later.

Figure 4:
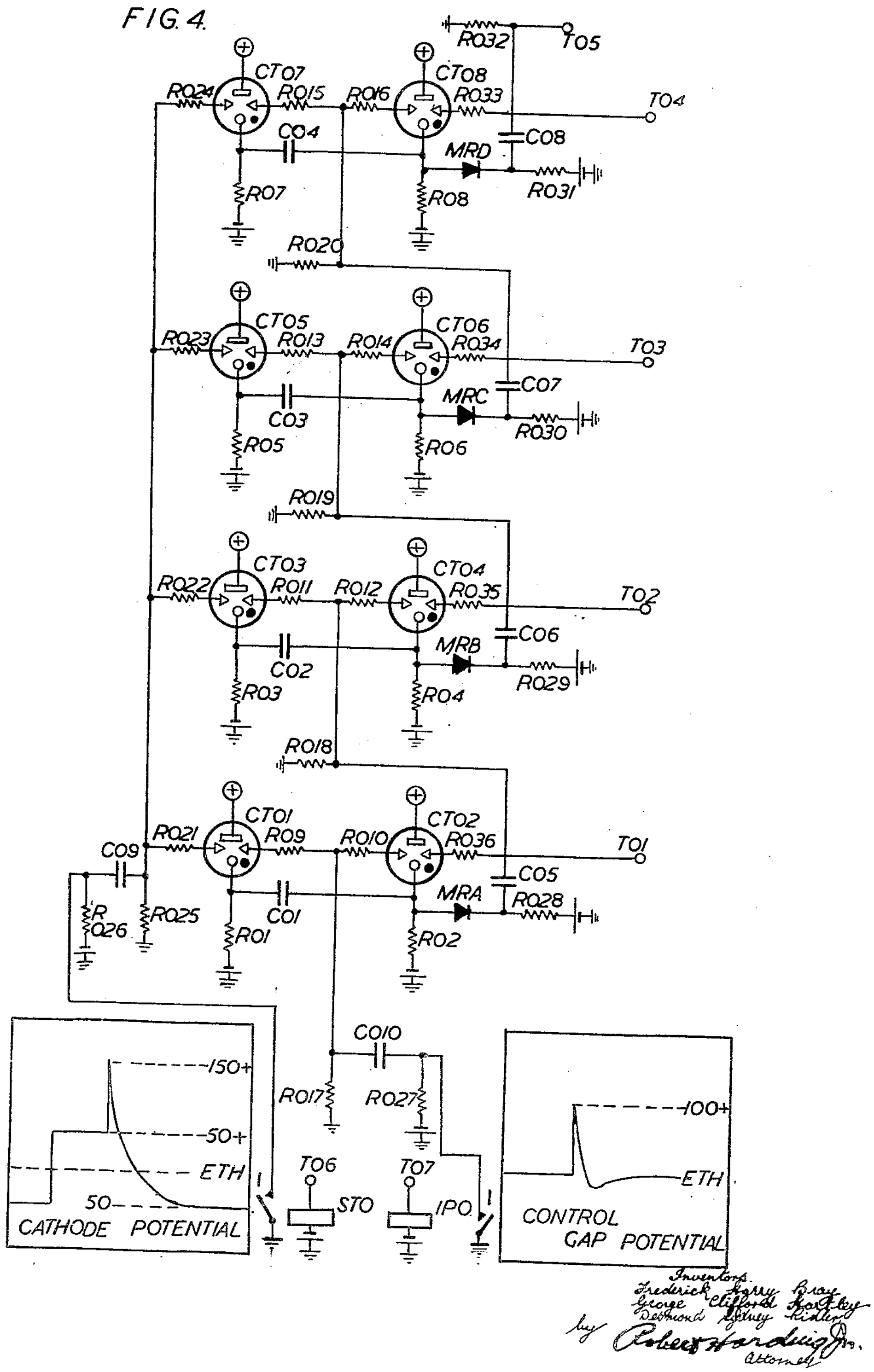

A circuit diagram of such a modified electric counter is shown in Fig. 4, which will now be described. The arrangement of Fig. 4 comprises eight cold cathode tubes CTO1, CTO3, CTO5, CTO7 forming the first set of tubes, and CTO2, CTO4, CTO6, CTO8 forming the second set of tubes. Each tube has a cold cathode connected across a resistor RO1, RO3, RO5, RO7; RO2, RO4, RO6, RO8 respectively to the negative potential of the additional supply source, the positive terminal of which is earthed. The anode of each tube has, in operation, applied to it the positive operating potential derived from the main supply source (not shown) whose negative terminal is earthed. Each tube has two auxiliary electrodes for triggering the tubes. One auxiliary electrode of each tube of the second set is connected across a resistor RO36, RO35, RO34, RO33 respectively to terminals TO1, TO2, TO3, TO4 for triggering some of these tubes and thereby impressing a digit code on the tubes of the first set. The other auxiliary electrode of each tube of the second set is connected across two resistors RO10, RO9; RO12, RO11; RO14, RO13; RO16, RO15, respectively to an auxiliary electrode of the corresponding tube of the first set. The other auxiliary electrode of each tube of the first set is connected across a resistor RO21, RO22, RO23, RO24, respectively to a triggering capacitor CO9 charged from the additional supply source across resistors RO25, RO26. The cold cathodes of the tubes of each pair are connected together across capacitors CO1, CO2, CO3, CO4 respectively. A further triggering capacitor CO10 is connected to the resistors RO9, RO10, and is charged from the additional supply source across resistors RO17, and RO27. The cold cathode of each tube of the second set is connected to one terminal of a rectifier MRA, MRB, MRC, MRD respectively, the other terminal of which is respectively connected to an electrode of a capacitor CO5, CO6, CO7, CO8, the other electrode of which is respectively connected to a resistor RO18, RO19, RO20, RO32, the free ends of which are earthed. The said other electrode of each of the capacitors CO5, CO6, CO7, is also connected respectively to the pair of resistors RO11, RO12; RO13, RO14; RO15, RO16, while the said other electrode of capacitor CO8 is connected to a terminal TO5. The capacitors CO5, CO6, CO7, CO8 are connected to the positive terminal of an auxiliary supply source whose negative terminal is earthed, and are charged respectively over the pairs of resistors RO28, RO18; RO29, RO19; RO30, RO20; RO31, RO32. A start relay STO is connected between the additional supply source and a terminal TO6 and an impulse relay IPO is connected between the additional supply source and a terminal TO7.

The operation of the arrangement is as follows: The start relay STO is energised by applying earth potential to its terminal TO6. The contact $sto1$ is closed and discharges the triggering capacitor CO9 across the resistor RO25. Thereby the cold discharge tubes of the first set are triggered and ignite across the surge limiting resistors RO21, RO22, RO23, RO24 respectively. The counter is capable of counting a total of sixteen impulses and is operated by earth impulses applied to terminal TO7. Each such impulse energises the impulse relay IPO. The contact *ipo1* is closed and causes the triggering capacitor CO16 to be discharged through the resistor RO17. The potential drop caused thereby is applied across the current limiting resistors RO9, RO10 to the auxiliary anodes of the tubes CTO1, CTO2 of the first pair of tubes. Tube CTO1 is already conducting. Tube CTO2 is triggered and ignites. Owing to the voltage drop across the resistor RO2, the potential of the cold cathode of tube CTO2 rises from its original negative potential to a positive potential, which equals the difference between the positive potential applied to the anode and the drop of potential across the main discharge gap. This rise in potential discharges the cathode coupling capacitor CO1, which causes the cathode potential of the tube CTO1 to increase positively and to reduce the potential across the main discharge gap of the tube CTO1 which is therefore de-ionised and ceases to conduct. Thus, tube CTO1 is now quenched and tube CTO2 ignited. More generally, whenever a tube ignites the other, previously ignited, tube of the same group is quenched owing to the flow of a discharge current from the respective capacitor CO1, CO2, CO3, CO4. Quenching of the tube CTO1 and igniting of the tube CTO2 which belongs to the second set does not affect the tubes CTO3 and CTO4 of the next succeeding group since the cathode potential of the tube CTO2 does not rise above the positive bias potential applied to the biassing resistor RO28 and the rectified MRA presents a high resistance to the flow of current in the direction from the resistor RO28 to the cathode of tube CTO2. When the relay IPO is de-energised, its contact *ipo1* is released and the triggering capacitor CO16 is charged again.

The second operation of the impulse relay IPO, again, closes the contact *ipo1*, whereby the triggering capacitor CO16 is, again, discharged. Thereby, the tube CTO1 of the first group is now ignited and the tube CTO2 of the first group quenched in a manner analogous to that just described. However, when a tube such as tube CTO1, of the first set of tubes ignites, a triggering impulse is transmitted to the next succeeding group, so as to ignite that tube which was previously not ignited and to quench the other tube. If the tube now ignited belongs to the first set, a triggering impulse is, again, transmitted to the following group, and so on. This effect will now be explained with reference to the first group of tubes. A similar effect takes place whenever a tube of the first set and belonging to any other group ignites. When tube CTO1 ignites, the discharge current from the capacitor CO1 momentarily raises the potential on the cathode of the tube CTO2 sufficiently to quench the tube CTO2. The cathode potential of the tube CTO2 is momentarily higher than the positive biassing voltage across the resistor RO28. Therefore, a current flows from the cathode of the tube CTO2 across the rectifier MRA to the resistor RO28 and causes a positive triggering impulse to be transmitted across the capacitor CO5 to the resistors RO11, RO12. This impulse causes the tube CTO4 to ignite whereupon the tube CTO3 is quenched.

In an analogous manner successive operations of the impulse relay IPO and its contact *ipo1* cause the tubes CTO1 and CTO2 alternately to be ignited and quenched. As explained above, whenever a tube of the first set ignites, a triggering impulse is transmitted to the next succeeding group of tubes. On the sixteenth operation of the impulse relay IPO and its contact *ipo1*, tube CTO7 is ignited and tube CTO8 is quenched. Igniting of the tube CTO7, which belongs to the first set, causes a positive triggering impulse to be sent across the capacitor CO8 to the terminal TO5, which impulse may be employed to operate an auxiliary circuit (not shown) thereby to indicate that the counter has counted sixteen impulses and is ready to receive a further set of sixteen impulses.

If the electric counter is required to count less than sixteen impulses, it may be pre-set by impressing a suitable pattern of positive potentials to terminals TO1, TO2, TO3, TO4, causing the corresponding tubes of the second set to be triggered and to ignite. For example, if the counter is used in an arrangement similar to that of Figs. 1A and 1B, the terminals TO1, TO2, TO3, TO4 should be connected to the counter side of the contacts *tr1—4* respectively, shown in Fig. 1A, the contact 2O5 being connected to the auxiliary anode of tube CT10 of Fig. 1A, triggering connections similar to those shown in Figs. 1A and1B being provided from the tube CTO8, CTO6, of Fig. 3 to tube CT9 and contact *ds9* of Fig. 1, and the relays STO and IPO of Fig. 4 being respectively replaced by the relays GA and I of Fig. 1A. Conversely, with obvious modifications, the electric counter of Fig. 1B may be used independently from the remainder of Figs. 1A and 1B for counting sixteen impulses, or less impulses if suitably pre-set.

Figure 5:
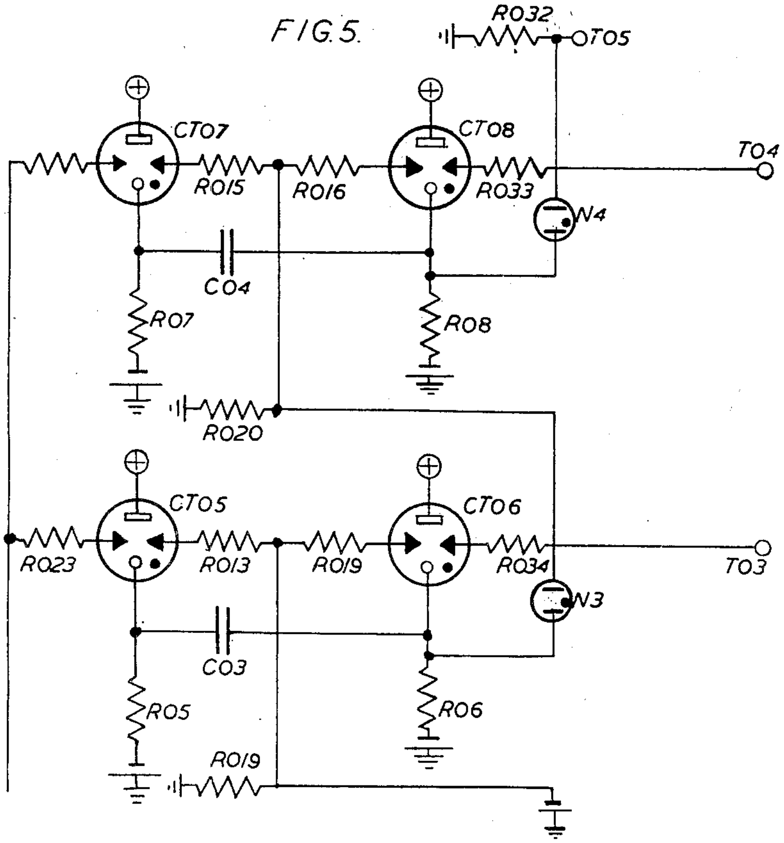
Fig. 5 illustrates another alternative means for triggering one pair of tubes from another.

In Fig. 5, which shows the last two pairs of tubes of a counting set, a small neon tube, e. g. N3, N4 replaces the rectifier network shown in Fig. 4. This arrangement has the advantage of simplicity, but may not be so flexible as the rectifier network. The potential changes are the same as before. The positive peak potential which occurs when CT6 is de-ionised is used to trigger the next pair of tubes. Since the level of potential across R2 is too high, a neon N3 is arranged in series such that the potential drop across the discharge gap of the tube reduces the potential applied to the control electrodes of the next pair to the required value.

It will be appreciated that it would be possible to insert a cross-connection frame between the storage sets of Fig. 1B and the counting sets so that translated digits are set out.

What is claimed is:

1. A circuit for counting electrical impulses corresponding to a binary code, comprising a plurality of gas-filled electron discharge tubes arranged in pairs, said tubes capable of two stable conditions, each of said tubes having an anode, a cathode, a first control electrode, and a second control electrode, corresponding first control electrodes of each of said pairs interconnected, means for selectively applying a triggering potential to corresponding second control electrodes of a first tube of said tube pairs, means for applying a triggering potential to corresponding second control electrodes of the second tubes of said tube pairs, a plurality of condensers, respective of said condensers serially disposed between the discharge paths of respective of said tube pairs, a plurality of coupling devices, respective of said devices connecting the discharge path of the second tube of each tube pair with the first control electrodes of a different one of said tube pairs, a source of potential, means for applying said potential to the anodes of each of said tubes, an output circuit coupled to said tubes, means for applying potential to said output circuit in accordance with the triggering potential applied to the first tubes of said tube pairs.

2. A circuit for counting electrical impulses as claimed in claim 1, wherein said coupling devices comprise transformers, each having a primary winding and a secondary winding, the primary winding of respective of said transformers serially connected to the discharge path of respective of the first tubes of said tube pairs, and the secondary windings of respective of said transformers serially connected between ground and the first control electrodes of a different one of said tube pairs.

3. A circuit for counting electrical impulses as claimed in claim 1, wherein said coupling devices further comprise a source of biassing potential, a second plurality of condensers, a plurality of uni-directional current devices, said uni-directional devices respectively serially connected between the respective discharge paths of the first tubes of said tube pairs, and said source of biassing potential, each of said second condensers respectively connected between said uni-directional devices and the first control electrodes of a different one of said tube pairs.

4. A system for translating a binary code into a decimal code comprising 8 cold cathode discharge tubes, each having a cathode, an anode and two auxiliary electrodes, said tubes arranged to form two groups of four tubes, one tube of each group paired with one tube of the other group, and a plurality of condensers, respective of said condensers serially connected between the discharge paths of each of said paired tubes, a plurality of coupling devices, respective of said devices connecting the discharge path of the second tube of each tube pair with a first auxiliary electrode of a different one of said tube pairs, a source of potential, means for applying said potential to the anodes of each of said tubes, means for applying a triggering potential to corresponding second auxiliary electrodes of the second tubes of said tube pairs, means for selectively applying a triggering potential to corresponding of the second auxiliary electrodes of the first tubes of said tube pairs, said tubes capable of two stable conditions upon the application of triggering potential from either of the means above stated, an out-going circuit, means for generating regularly recurring pulses, switching means for applying said pulses to said circuit, said switching means under control of two of said tube pairs.

5. A system for translating a binary code into a decimal code as claimed in claim 4 wherein said switching means further comprise a pair of cold cathode discharge tubes each having an anode, a cathode and an auxiliary electrode, a pair of electromagnetic relays, a source of energizing potential for said relays, said relays respectively connected between said energizing source and said last-mentioned discharge tubes, said relays adapted to render ineffective said generating means in accordance with the triggering potential applied to said groups of tubes.

FREDERICK HARRY BRAY.
GEORGE CLIFFORD HARTLEY.
DESMOND SYDNEY RIDLER.

REFERENCES CITED

The following references are of record in the file of this patent:

UNITED STATES PATENTS

| Number | Name | Date |
|---|---|---|
| 2,076,335 | Dallenbach | May 6, 1937 |
| 2,099,065 | Holden | Nov. 16, 1937 |
| 2,210,574 | Fitch | Aug. 6, 1940 |
| 2,308,778 | Prince | Jan. 19, 1943 |
| 2,342,753 | Pearson | Feb. 29, 1944 |
| 2,433,385 | Miller | Dec. 30, 1947 |